Patented Jan. 28, 1947

2,415,047

UNITED STATES PATENT OFFICE 2,415,047

INSECT-CONTROLLING COMPOSITIONS AND METHOD FOR CONTROLLING INSECTS THEREBY

Murray Senkus, Terre Haute, Ind., assignor to Commercial Solvents Corporation, Terre Haute, Ind., a corporation of Maryland No Drawing. Application August 4, 1945, Serial No. 609,032

7 Claims. (Cl. 167—33)

This invention relates to new and useful insect-controlling compositions and more particularly to compositions containing along with a solid or liquid carrier a 5-amino-1,3-disubstituted hexahydropyrimidine compound having the following structural formula:

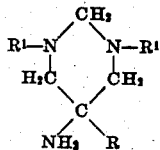

wherein R may be either hydrogen, alkyl, aryl or hydroxymethyl, and $R^1$ may be alkyl, aryl, aralkyl, 2-hydroxyalkyl, dialkylaminoalkyl or 3,5-dioxacyclohexyl.

I have found that the new compositions of my invention are useful not only as insecticides and as toxic compositions for controlling and killing insects, but have also high insect-repellency characteristics which adapt them for use in this capacity, and especially for use in mothproofing rugs, fabrics and the like, and for rendering various surfaces insect-repellent.

The 5-aminohexahydropyrimidines illustrated above may be prepared by catalytic hydrogenation in the liquid phase under pressure, of the corresponding 5-nitrohexahydropyrimidines, as described in my copending application Serial No. 547,282, filed July 29, 1944. The 5-nitrohexahydropyrimidines used as starting materials in the preparation of the amino compounds may be prepared by reacting a suitable primary amine and formaldehyde with a nitrohydrocarbon having the nitro group attached to a primary carbon atom, in the mole ratio of approximately three moles of formaldehyde to two moles of primary amine to one mole of nitrohydrocarbon, as described in my copending application Serial No. 547,281 filed July 29, 1944.

The proportions of the substituted 5-aminohexahydropyrmidines, which may be used in the compositions according to my invention may vary widely depending upon the composition or carrier with which they are associated and upon the nature of the insect pest to be controlled, as well as on the particular substituted 5-aminohexahydropyrimidine employed. Quantities up to about 50% may be used, although usually much smaller quantities, in the range of about 1% to 10% will usually be sufficient.

The insect controlling compositions of my invention comprise one or more of the substituted 5-aminohexahydropyrimidines mixed with a suitable carrier or vehicle. Any of the vehicles or solvents commonly employed in insecticidal sprays and in which the compounds may be dissolved or emulsified may be used in preparing the insect controlling compositions of my inventions, such as kerosene, "Ultrasene," alcohols, and other solvents, and these compositions may be made up as solutions or emulsions as appears appropriate or suitable dusts may be impregnated therewith.

The compositions of my invention have wide applicability in controlling insect pests, being valuable, not only as insecticides but also as repellents for flies, moths and the like, as brought out above and these characteristics are more fully illustrated by the repellency, mothproofing and toxicity tests described below:

EXAMPLE I

REPELLENCY TO HOUSEFLIES

The substituted 5-aminohexahydropyrimidine compounds listed below were made up in alcoholic solution, using 10% concentration of the aminohexahydropyrimidine. The solutions were sprayed on separate blotter strips of 1 inch by 3 inches area, with five $\frac{7}{16}$ inch holes in each of the blotters and these blotter strips were placed in a hemispherical wire cage. Food was placed in the holes in the sprayed blotter. Another blotter, untreated, also containing food in five similar holes, was placed in each cage along with the treated strip. At the time intervals noted in the table the strips were exposed to feeding by twenty houseflies. The figure listed below as per cent repellency represents the deviation from equal distribution of the flies on the two strips.

Table I
BAIT-IN-HOLE REPELLENCY TESTS WITH HOUSE FLIES

| Compound | Percent repellency at hour intervals tested | | | | | | |
|---|---|---|---|---|---|---|---|
| | 2 | 3 | 5 | 6 | 26 | 30 | 52 |
| 5-amino-1,3-bis(1-methylheptyl)-5-methyl-hexahydropyrimidine | | | 100 | 89 | | 90 | 72 | 86 |
| 5-amino-1,3-diisopropyl-5-methylhexahydro-pyrimidine | | | | 3 | | | | |
| 5-amino-1,3-diphenyl-5-methylhexahydropyrimidine | | | 37 | | | | | |
| 5-amino-1,3-bis(2,2-dimethyl-3-dimethylamino-propyl)-5-methylhexahydropyrimidine | | | 80 | 39 | | 19 | 40 | 35 |
| 5-amino-1,3-diisopropyl-5-hydroxymethylhexa-hydropyrimidine | | | 78 | 45 | | 34 | 11 | 28 |
| 5-amino-1,3-bis(2-ethylhexyl)-5-ethylhexahydropyrimidine | 100 | | | 69 | | 69 | 76 | 75 |
| 5-amino-1,3-dihexahydrobenzyl-5-methylhexa-hydropyrimidine | 100 | | | 73 | | 44 | 62 | 59 |
| 5-amino-1,3-di-p-tolyl-5-methylhexahydro-pyrimidine | 38 | | | | 18 | | | |
| 5-amino-1,3-bis(1-methylheptyl)-5-ethylhexa-hydropyrimidine | 92 | | | 65 | | 85 | 54 | 67 |
| 5-amino-1,3-dibenzyl-5-methylhexahydropyrimidine | 100 | | | 72 | | 69 | 58 | 51 |
| 5-amino-1,3-bis(1-methyl-3,5-dioxacyclohexyl)-5-isopropylhexahydropyrimidine | 54 | | | | 14 | | | |
| 5-amino-1,3-bis(1-methyl-3,5-dioxacyclohexyl)-5-propylhexahydropyrimidine | 19 | | | | 26 | | | |
| 5-amino-1,3-dibenzyl-5-propylhexahydro-pyrimidine | 60 | | | | 57 | 74 | | 58 |
| 5-amino-1,3-bis(2-ethylhexyl)-5-methyl-hexahydropyrimidine | 100 | | | | 94 | 76 | | 5 |
| 5-amino-1,3-dibenzyl-5-(2-ethylhexyl)-hexahydropyrimidine | 31 | | | | 31 | 19 | | |
| 5-amino-1,3-dioctadecyl-5-ethylhexahydro-pyrimidine | 27 | | | | 8 | | | |
| 5-amino-1,3-diisopropyl-5-(2-ethylhexyl)-hexahydropyrimidine | 100 | | | 96 | | 69 | 76 | 74 |
| 5-amino-1,3-dimethyl-5-phenylhexahydro-pyrimidine | | 100 | | | 67 | 0 | | |

EXAMPLE II

Fly repellency tests were run in the same manner as that described in Example I, except that the 5-amino-hexahydropyrimidines were made up in 50% solutions in alcohol. The fly repellencies at the hourly intervals noted, are listed in the table below:

Table II
BAIT-IN-HOLE REPELLENCY TESTS WITH HOUSE FLIES

| Compound | Per cent repellency at intervals noted, hours | | | | | | |
|---|---|---|---|---|---|---|---|
| | 2 | 5 | 30 | 50 | 75 | 100 | 172 |
| 5-amino-1,3-diphenyl-5-methylhexa-hydropyrimidine | 91 | 76 | 57 | 27 | | | |
| 5-amino-1,3-bis(1,1-dimethyl-2-hydroxy-ethyl)-5-methylhexahydropyrimidine | 47 | 48 | | | | | |
| 5-amino-1,3-bis(2,2-dimethyl-3-dimethyl-aminopropyl)-5-methylhexahydropyrimidine | 100 | 60 | 60 | 45 | | | |
| 5-amino-1,3-bis(1-methyl-3,5-dioxacyclo-hexyl)-5-methylhexahydropyrimidine | 90 | 25 | | | | | |
| 5-amino-1,3-diisopropyl-5-hydroxymethyl-hexahydropyrimidine | 100 | 60 | 64 | 77 | 36 | | |
| 5-amino-1,3-bis(2-ethylhexyl)-5-ethylhexahydropyrimidine | 100 | 100 | 100 | 100 | 100 | 100 | 93 |
| 5-amino-1,3-dihexahydrobenzyl-5-methylhexa-hydropyrimidine | 100 | 88 | 58 | 61 | 42 | | |
| 5-amino-1,3-di-p-tolyl-5-methylhexahydro-pyrimidine | 92 | 75 | 24 | | | | |
| 5-amino-1,3-bis(1-methylheptyl)-5-ethyl-hexahydropyrimidine | 100 | 100 | 100 | 100 | 100 | 100 | 100 |
| 5-amino-1,3-dibenzyl-5-methylhexahydro-pyrimidine | 100 | 93 | 72 | 52 | 33 | | |
| 5-amino-1,3-bis(1-methyl-3,5-dioxa-cyclohexyl)-5-isopropylhexahydropyrimidine | 82 | 69 | 47 | | | | |
| 5-amino-1,3-bis(1-methyl-3,5-dioxacyclo-hexyl)-5-propylhexahydropyrimidine | 82 | 26 | | | | | |
| 5-amino-1,3-dibenzyl-5-propylhexahydro-pyrimidine | 100 | 87 | 80 | 40 | | | |
| 5-amino-1,3-bis(2-ethylhexyl)-5-methyl-hexahydropyrimidine | 100 | 100 | 100 | 100 | 100 | 100 | 100 |
| 5-amino-1,3-dibenzyl-5-(2-ethylhexyl)-hexahydropyrimidine | 100 | 13 | | | | | |
| 5-amino-1,3-diisopropyl-5-(2-ethylhexyl)-hexahydropyrimidine | 100 | 100 | 100 | 100 | 100 | 100 | 93 |

EXAMPLE III

MOTHPROOFING

Pieces of wool mohair cloth were dipped in alcoholic solutions of various 5-aminohexahydropyrimidines at the concentrations indicated and after squeezing out the excess liquid were hung in an inside atmosphere to dry for at least two weeks. The cloths were then placed in individual containers with 5 carpet beetle larvae for feeding tests, and results observed weekly for three weeks. Where there was no feeding of the beetles, or where the feeding was negligible the mothproofing is indicated as "good." Where there was some feeding; the results are described as "doubtful," and where feeding was equal to that on an untreated piece of wool the results are indicated as zero. These results are tabulated below.

Table III
MOTHPROOFING

| Compound | 5% concentration | | | 1% concentration | | |
|---|---|---|---|---|---|---|
| | 1 week | 2 weeks | 3 weeks | 1 week | 2 weeks | 3 weeks |
| 5-amino-1,3-bis(1-methylheptyl)-5-methyl-hexahydropyrimidine | Good | Good | Good | Good | Good | Good. |
| 5-amino-1,3-diphenyl-5-methylhexa-hydropyrimidine | do | do | do | do | do | Do. |
| 5-amino-1,3-bis(1,1-dimethyl-2-hydroxy-ethyl)-5-methylhexahydropyrimidine | do | do | do | do | Doubtful | Poor. |
| 5-amino-1,3-bis(2,2-dimethyl-3-dimethyl-aminopropyl)-5-methylhexahydropyrimidine | do | do | do | do | Good | Good. |
| 5-amino-1,3-bis(1-methyl-3, 5-dioxacyclo-hexyl)-5-methylhexahydropyrimidine | do | do | do | do | do | Do. |
| 5-amino-1,3-diisopropyl-5-hydroxymethyl-hexahydropyrimidine | do | do | do | do | Poor | Poor. |
| 5-amino-1,3-bis(2-ethylhexyl)-5-ethyl-hexahydropyrimidine | do | do | do | do | Good | Good. |
| 5-amino-1,3-dihexahydrobenzyl-5-methylhexahydropyrimidine | do | do | do | do | do | Do. |
| 5-amino-1,3-di-p-tolyl-5-methylhexa-hydropyrimidine | do | do | do | No test | | |
| 5-amino-1,3-bis(1-methylheptyl)-5-ethylhexahydropyrimidine | do | do | do | do | | |
| 5-amino-1,3-dibenzyl-5-methylhexahydropyrimidine | do | do | do | do | | |
| 5-amino-1,3-bis(1-methyl-3,5-dioxa-cyclohexyl)-5-isopropylhexahydropyrimidine | do | do | do | do | | |
| 5-amino-1,3-dibenzyl-5-propylhexahydropyrimidine | do | do | do | do | | |
| 5-amino-1,3-bis(2-ethylhexyl)-5-methylhexahydropyrimidine | do | do | do | do | | |
| 5-amino-1,3-dibenzyl-5-(2-ethylhexyl)-hexahydropyrimidine | do | do | do | do | | |
| 5-amino-1,3-dioctadecyl-5-ethylhexahydropyrimidine | do | do | do | do | | |
| 5-amino-1,3-diisopropyl-5-(2-ethylhexyl)-hexahydropyrimidine | do | do | do | do | | |
| 5-amino-1,3-dimethyl-5-phenylhexahydropyrimidine | do | do | do | do | | |

EXAMPLE IV

FLY SPRAY TOXICANT TESTS

The toxic effects of my new insect controlling compositions were evaluated by means of a standard technique employed in testing materials as fly spray toxicants. In carrying out these tests, twenty flies were confined in each of several spherical screen cages, and each cage was revolved in a spray of the test solution until about 1.2 cc. of solution had been applied. Thirty seconds after the spraying was stopped, the flies were shaken out of the spherical cages into clean cubical cages. The cages were held for twenty-four hours and at that time the number of flies killed was recorded. Each composition was made up in a 5% solution in "Ultrasene" an odorless kerosene, and each test was run in quintuplicate. The results given in the table below are the averages of these five tests on each composition expressed in percent of flies killed.

Table IV

| Compound | Per cent kill in 5% fly spray in "Ultrasene" |
|---|---|
| 5-amino-1,3-bis(1-methylheptyl)-5-methyl-hexahydropyrimidine | 62.7 |
| 5-amino-1,3-diisopropyl-5-methylhexahydropyrimidine | 38.2 |
| 5-amino-1,3-bis(2,2-dimethyl-3-dimethylaminopropyl)-5-methylhexahydropyrimidine | 40.2 |
| 5-amino-1,3-bis(2-ethylhexyl)-5-ethylhexahydropyrimidine | 13.0 |
| 5-amino-1,3-dihexahydrobenzyl-5-methylhexahydropyrimidine | 57.2 |
| 5-amino-1,3-di-p-tolyl-5-methylhexahydropyrimidine | 83 |
| 5-amino-1,3-bis(1-methylheptyl)-5-ethylhexahydropyrimidine | 63 |
| 5-amino-1,3-dibenzyl-5-methylhexahydropyrimidine | 86 |
| 5-amino-1,3-bis(1-methyl-3,5-dioxacyclohexyl)-5-isopropylhexahydropyrimidine | 10 |
| 5-amino-1,3-bis(1-methyl-3,5-dioxacyclohexyl)-5-propylhexahydropyrimidine | 12 |
| 5-amino-1,3-dibenzyl-5-propylhexahydropyrimidine | 89 |
| 5-amino-1,3-bis(2-ethylhexyl)-5-methylhexahydropyrimidine | 71 |
| 5-amino-1,3-dibenzyl-5-(2-ethylhexyl)-hexahydropyrimidine | 70 |
| 5-amino-1,3-diisopropyl-5-(2-ethylhexyl)-hexahydropyrimidine | 42 |
| 5-amino-1,3-dimethyl-5-phenylhexahydropyrimidine | 17 |

EXAMPLE V 5-amino-1,3-bis(1-methylheptyl) - 5 - methylhexahydropyrimidine was made up in a 50% solution in alcohol, and these solutions tested for fly repellency as described in Example I. The blotter sprayed with the 50% solution was still exerting 100% repellency after 1155 hours (48 days). The 25% solution exerted 92% repellency at 730 hours; 68% repellency at 898 hours.

EXAMPLE VI 5-amino-1,3-bis(1-methylheptyl) - 5 - methylhexahydropyrimidine made up to a 50% solution in alcohol was sprayed on various surfaces and the fly repellency tested as follows:

Drops of paraffin were placed on each sample, and on each of the paraffin spots were placed malt extract to serve as fly food. Each treated sample and a control were placed in hemispherical wire cages along with twenty flies. Duplicates of each test sample were hung outdoors and indoors, and the feeding of the flies noted upon the several samples. After feeding, results were noted, the flies were removed, the samples allowed to age, and at various intervals as indicated in Table V below, twenty flies were again placed in each cage, and their feeding noted. The results are illustrated in the table below.

Table V

REPELLENCY OF 50% SOLUTIONS OF 5-AMINO-1,3-BIS(1-METHYLHEPTYL) - 5 - METHYLHEXAHYDROPYRIMIDINE ON VARIOUS SURFACES

| Surface | Location | No. of flies feeding at— | | |
|---|---|---|---|---|
| | | 3 days | 7 days | 11 days |
| Lacquered screen | Indoors | 0 | 5 | 15 |
| | Outdoors | 6 | 5 | 11 |
| Painted wood | Indoors | 13 | 18 | |
| White paint | Outdoors | 13 | 20 | |
| Unpainted wood | Indoors | 0 | 0 | 3 |
| | Outdoors | 15 | 14 | |
| Untreated control | | 12–18 | 12–18 | |

Another group of tests similarly run with the same solution gave the following results indicated in percent repellency based on a standard of 8 flies normally feeding.

Table VI

| Surface | Location | Percent repellency at— | | |
|---|---|---|---|---|
| | | 7 days | 14 days | 21 days |
| Canvas | Indoors | 100 | 100 | 100 |
| | Outdoors | 100 | 100 | 75 |
| Lacquered screen | Indoors | 100 | 100 | 87.5 |
| | Outdoors | 100 | 100 | 37.5 |
| Galvanized screen | Indoors | 100 | 100 | 100 |
| | Outdoors | 100 | 100 | 100 |
| Glass | Indoors | 100 | 100 | 87.5 |
| | Outdoors | 100 | 37.5 | 12.5 |

The N-substituted 5-aminohexahydropyrimidines are best applied in a liquid carrier, either as a solution or an emulsion, particularly since most of the compounds are themselves liquids. However, it may be desirable in some cases to apply the toxic and repellent compositions in the form of dusts, and in such cases suitable solid carriers such as pyrophyllite, talc or the like may be impregnated with the desired quantity of the 5-amino-hexahydropyrimidine compound, and the dust applied to the surface to be controlled.

The 5-aminohexahydropyrimidines may be used with a suitable carrier, either singly or mixed, or in combination with other insecticides or insect controlling compositions, and are particularly useful in admixture with certain insecticides of the type which are toxic but not repellent to insects, for example in combination with insecticides of the 1,1-bis(p-chlorophenyl)-2,2,2-trichloroethane type and of the aliphatic thiocyanate type to yield compositions highly effective in both repellency and toxicity to various insect pests.

While the above describes the preferred embodiments of my invention, it will be understood that departures may be made therefrom, within the scope of the specification and appended claims.

What is claimed is:

1. An insect-controlling composition comprising a 5-amino-1,3-disubstituted-hexahydropyrimidine and a carrier therefor.

2. The composition of claim 1 wherein the carrier is a member selected from the group consisting of alcohols and petroleum distillates.

3. The composition of claim 1 wherein the carrier is an alcohol.

4. An insect-controlling composition comprising 5-amino-1,3-bis(1-methylheptyl)-5-methylhexahydro-pyrimidine and a carrier therefor.

5. A method for rendering surfaces insect repellent which comprises treating said surfaces with a composition comprising a 5-amino-1,3-disubstituted-hexahydropyrimidine and a carrier therefor.

6. A method for moth-proofing fabrics which comprises impregnating said fabric with a composition comprising a 5-amino-1,3-disubstituted-hexahydropyrimidine and a liquid carrier therefor.

7. The method of claim 6, wherein the 5-amino-1,3-disubstituted-hexahydropyrimidine is 5-amino-1,3-bis(1-methylheptyl)-5-methylhexahydropyrimidine.

MURRAY SENKUS.